H. PENNIE
PIPE AND HOSE COUPLING.

No. 181,714.      Patented Aug. 29, 1876.

Witnesses:
James Turf
Ernest C. Webb

Inventor:
Henry Pennie
by his attorney
A. v. Bresen

UNITED STATES PATENT OFFICE.

HENRY PENNIE, OF BROOKLYN, NEW YORK, ASSIGNOR TO HIMSELF AND JAMES L. SHARP, OF NEW YORK CITY.

IMPROVEMENT IN PIPE AND HOSE COUPLINGS.

Specification forming part of Letters Patent No. 181,714, dated August 29, 1876; application filed July 17, 1876.

*To all whom it may concern:*

Figure 1:
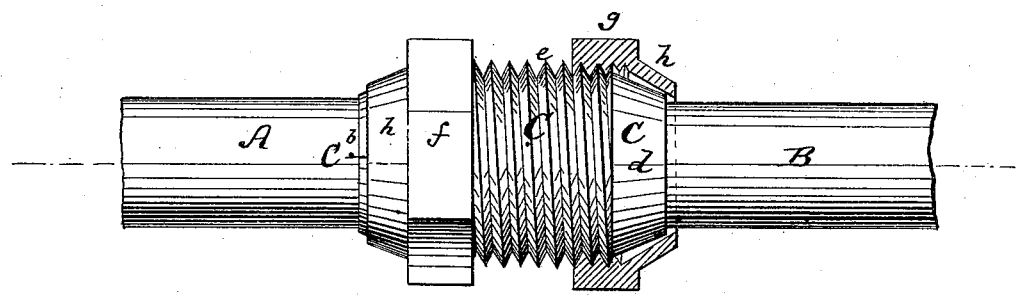
Figure 2:
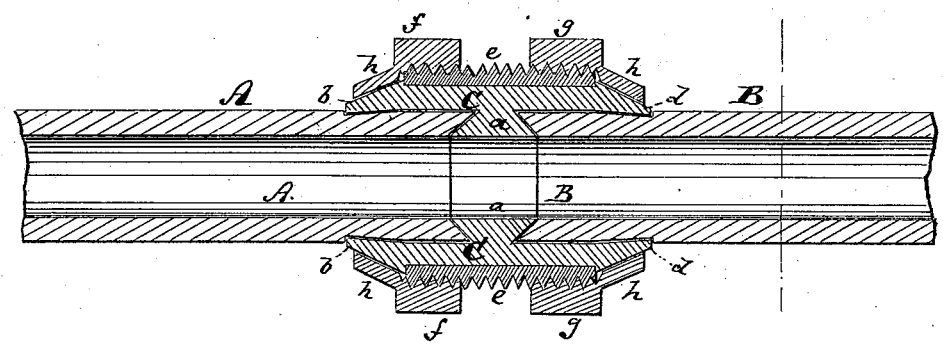
Figure 3:
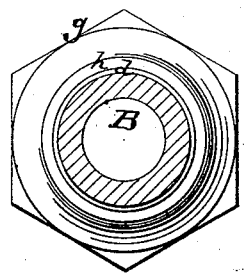

Be it known that I, HENRY PENNIE, of Brooklyn, in the county of Kings and State of New York, have invented a new and Improved Pipe and Hose Coupling, of which the following is a specification:

Figure 1 is a side view; Fig. 2, a longitudinal section; and Fig. 3, an end view of my improved coupling.

Similar letters of reference indicate corresponding parts in all the figures.

This invention relates to a new mechanism for firmly connecting two pieces of lead pipe, rubber hose, or other soft tubing; and consists, principally, in effecting the desired result by means of an outer soft-metal shell or sleeve, which is pressed into the soft pipe or tube; also, in the arrangement of mechanism for pressing the ends of said shell or sleeve into or against the pieces of pipe to be joined, all as hereinafter more fully described.

In the drawing, the letters A and B represent two pieces of lead pipe to be joined. C is a short tube, of lead or other soft or yielding metal, its inner diameter being about equal to the outer diameter of the pipes A B, so it can be slipped over said pipes, as shown. On its inner circumference this sleeve C is provided with an inner rib or ring, $a$, against which the ends of the pipes A and B abut, as in Fig. 2. I prefer to bevel this ring $a$ in manner shown, and to taper the ends of the pipes A B in conformity with said bevel. By providing the sleeve C with the ring $a$, the pipes A B become properly centered in the sleeve, an equal length of each being entered in said sleeve. The production of a tight joint is moreover facilitated if the ends of the pipes are drawn tight against the ring $a$.

The sleeve C, whether made with or without said ring $a$, is made with tapering ends $b\ d$, as shown; and I desire it to be understood that when I described the said sleeve to be made of yielding material, I had reference only to its reduced ends, for its middle portion may be made of harder unyielding substance, without in any way changing the effect of the invention.

The body of the sleeve C, between its tapering ends $b\ d$, carries a screw, $e$, over which two nuts, $f$ and $g$, can be screwed from opposite sides, as shown in Figs. 1 and 2. Each of these nuts has a conical extension, $h$, which differs in the angle from that of the tapers $b\ d$, as indicated in Fig. 1, which figure shows one nut in section and in position before it has pressed the end $d$ of the sleeve. By screwing the nut upon the sleeve its conical part is gradually drawn upon and against the yielding taper $d$ (or $b$) and caused to press the same into the yielding pipe B (or A) or against a hard pipe, and thus to produce the result indicated in Fig. 2—that is to say, the yielding ends of the sleeve are pressed into the pipes A B with such force as to insure their permanent connection with the sleeve, and also produce a tight joint. For many purposes the nuts may now be withdrawn, leaving the sleeve secure on the pipes, or they may remain in the position shown in Fig. 2.

By pressing the ends of the sleeve in manner described, the pipes will be indented as shown, or the pipes may be previously indented or grooved for the reception of the ends of the sleeve.

I claim as my invention—

1. The combination of the cylindrical continuous sleeve C, with the pipes A and B, which are indented or grooved, to receive the ends of the sleeve, substantially as herein shown and described.

2. The combination of the sleeve C, which has tapering ends $b\ d$ of flexible material, with the nuts $f$ and $g$, which have conical extensions $h$, all substantially as herein shown and described.

3. The process, herein described, of joining two ends of pipe A B by inserting them within a cylindrical continuous sleeve, and thereupon crowding the ends of said sleeve closely against the pipes, substantially as specified.

HENRY PENNIE.

Witnesses:
A. v. BRIESEN,
ERNEST C. WEBB.